United States Patent [19]

Ohkubo et al.

[11] 4,070,303
[45] Jan. 24, 1978

[54] SOLVENT FOR DYE USED IN PRESSURE-SENSITIVE COPYING PAPER

[75] Inventors: Kimio Ohkubo, Tokyo; Mikio Fujioka, Ichigayadaimachi, both of Japan

[73] Assignee: Kureha Kagaku Kogyo Kabushiki Kaisha, Tokyo, Japan

[21] Appl. No.: 680,272

[22] Filed: Apr. 26, 1976

[30] Foreign Application Priority Data

May 2, 1975 Japan .................................. 50-52588

[51] Int. Cl.$^2$ ............................................... B01F 1/00
[52] U.S. Cl. ..................................... 252/364; 252/316
[58] Field of Search .............................. 252/364, 316

[56] References Cited

U.S. PATENT DOCUMENTS

| 3,016,308 | 1/1962 | Macaulay | 117/36.7 |
| 3,846,331 | 11/1974 | Konishi et al. | 252/364 |

FOREIGN PATENT DOCUMENTS 4,987,411  8/1974  Japan.

Primary Examiner—Stephen J. Lechert, Jr.
Attorney, Agent, or Firm—Lane, Aitken, Dunner & Ziems

[57] ABSTRACT

Disclosed is a composition used as a solvent for dye used in pressure-sensitive copying paper containing an aromatic solvent and an aliphatic di-ester of the formula ROOC (CH$_2$) COOR wherein R is methyl or ethyl and $n$ is 2–4.

6 Claims, No Drawings

SOLVENT FOR DYE USED IN PRESSURE-SENSITIVE COPYING PAPER

FIELD OF THE INVENTION

This invention relates to a novel solvent for dye used in pressure-sensitive copying paper, which can facilitate the color development of the dye.

BACKGROUND OF THE INVENTION

Recent advances in pressure-sensitive copying paper have led to its use in widely expanded fields. The pressure-sensitive copying paper itself has been improved to a large extent and a number of new dyes and color developing systems have been successively developed. In the prior art, PCB (polychlorinated biphenyl) was exclusively used as a solvent for dye used in the paper. However, recently the use of PCB has been prohibited because of its toxicity and recognition as a pollutant. Therefore, as a substitute for PCB various aromatic hydrocarbon solvents were developed. While the use of pressure-sensitive copying paper has recently expanded into various fields and color systems are more effectively developed, these aromatic hydrocarbon solvents are found not to provide a sufficient rate of color development of the dye.

SUMMARY OF THE INVENTION

Therefore, an object of the present invention is to provide an improved solvent for dye used in pressure-sensitive copying paper, which can increase the rate of color development of the dye.

This object and the other objects of the present invention will become apparent from the following description.

It has now been discovered that a composition obtained by adding a specified amount of a certain di-ester of aliphatic acid to a known aromatic hydrocarbon commonly used as a solvent for the dye can surprisingly increase the rate of color development of the dye when used as a solvent.

According to the present invention, there is provided a solvent consisting of an aromatic hydrocarbon and a specified amount of a di-ester of aliphatic acid having the general formula:

$$ROOC\text{--}(CH_2)_n\text{--}COOR$$

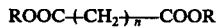

wherein R is methyl or ethyl and $n$ is an integer from 2 to 4.

DETAILED DESCRIPTION OF THE INVENTION

The aromatic hydrocarbon employed herein has a high boiling point and is selected from known dye solvents conventional in pressure-sensitive copying paper. These aromatic hydrocarbons include, for example, alkyl naphthalenes, e.g. dipropyl naphthalene; alkyl biphenyls, e.g. isopropyl biphenyl; triaryl dimethanes, e.g. dibenzyl toluene; diaryl ethanes, e.g. phenyl xylyl ethane; hydrogenated terphenyls; and the like.

The di-ester of aliphatic acid to be added to the above described aromatic hydrocarbon hydrocarbon has the general formula:

$$ROOC\text{--}(CH_2)_n\text{--}COOR$$

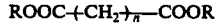

wherein R is methyl or ethyl and $n$ is an integer from 2 to 4 and includes, for example, dimethyl and diethyl esters of the aliphatic acids such as succinic, glutaric and adipic acids. Di-esters of other aliphatic acids are excluded because di-esters of a lower aliphatic acid ($n = 1$) are unsuitable due to their boiling point and odor and di-esters of higher aliphatic acids ($n \geq 5$) are not suitable due to lower effectiveness. Di-esters in which R is propyl or a radical having a longer chain than propyl while $n$ is an integer from 2 to 4 are also substantially ineffective. Therefore, the aliphatic di-ester used in the present invention is limitted to dimethyl succinate, diethyl succinate, dimethyl glutarate, diethyl glutarate, dimethyl adipate and diethyl adipate. Mixtures of two or more of these di-esters may also be used.

The solvent according to the present invention consists essentially of 100 parts by weight of the aromatic hydrocarbon and 0.5 to 10 parts by weight, preferably 2 to 6 parts by weight of the aliphatic di-ester. If the solvent contains more than 10 parts by weight of the aliphatic di-ester per 100 parts by weight of the aromatic hydrocarbon, the density of color development of the dye is too low when the solvent is used. On the other hand, if the solvent contains less than 0.5 part by weight of the aliphatic di-ester, an appreciable effect can not be expected. Therefore, the above defined ratio of the aliphatic di-ester to the aromatic hydrocarbon is critical.

The solvent of the present invention can increase the rate of color development of the dye. Particularly when a color developing agent of phenolic resin or organic carboxylic acid series is used as an acidic color developing material, the solvent of this invention can make the rate of color development of the dye substantially higher than when an aromatic hydrocarbon which does not contain the aliphatic di-ester is alone used as the solvent. Moreover, the solvent of this invention does not exhibit any de-sensitizing effect or cause any decrease in the color development of the dye. The solvent of this invention can be used in any preferred manner in combination with dye. For example, a mixture of the solvent and the dye can be capsulated by the so-called coacervation method into micro-capsules, which are applied to a sheet of paper. When one writes letters on the capsule-coated surface of this sheet with a ball-point pen, the letters appear very clear. The solvent of this invention can provide a pressure-sensitive copying paper which is advantageous in that one can write letters with a ball-point pen on the surface of an upper sheet of a pressure-sensitive paper set, which is coated with capsules containing the solvent of this invention. On the contrary, one can not write letters with a ball-point pen on the surface of an upper sheet which is coated with capsules containing a conventional solvent of an alone.

The present invention will be understood more readily with reference to the following examples; however, these examples are intended to be illustrative only and are not to be construed as limiting the scope of the invention.

EXAMPLE 1

Dipropyl naphthalene, hydrogenated terphenyl and xylyl phenyl ethane were selected as typical solvents for dye used in pressure-sensitive paper, while Crystal Violet lactone was selected as the dye. The solvent and the dye are mixed and capsulated by the coacervation method into capsules encapsulated with a gelatin film, which are applied on an upper sheet of a pressure-sensitive copying paper set. In the same manner, capsules are prepared from the solvents obtained by adding 5 parts by weight of dimethyl adipate, diethyl succinate, dioctyl adipate and dibutyl sebacate (the former two are within and the latter two are outside of the scope of this invention), respectively, per 100 parts by weight of the above selected solvent and applied on an upper sheet.

The lower sheet used in this example is coated with a commercially available color developing agent of a phenolic resin. The thus obtained pressure-sensitive copying paper sets are tested for the coefficient of rate of color development. Results are shown in Table 1 below. The term "coefficient of rate of color development" means the ratio of times required for the density of color development determined in terms of absorbance to reach 80% of the maximum achievable density. It is assumed that the rate of color development in the pressure-sensitive copying paper prepared by using the solvent aromatic hydrocarbon without the di-ester is the standard (value of coefficient = 1). The coefficient can be expressed by the following formula:

Coefficient of rate of color development = $t_0/t_1$
wherein $t_0$: time required when no di-ester is added, and $t_1$: time required when a di-ester is added.

Table 1

|  | dimethyl adipate | dioctyl adipate | diethyl succinate | dibutyl sebacate |
|---|---|---|---|---|
| dipropyl naphthalene | 10 | 1.1 | 9 | 1.3 |
| hydrogenated terphenyl | 8.5 | 1.5 | 10 | 1.9 |
| xylyl phenyl ethane | 5.2 | 1.0 | 5.4 | 1.0 |

It is obvious from Table 1 that dimethyl adipate and diethyl succinate which are within the scope of the invention can substantially increase the rate of color development, while dioctyl adipate and dibutyl sebacate which are out of the scope of the invention exert no appreciable effect.

EXAMPLE 2

To 100 parts by weight of dipropyl naphthalene were added 3, 5, 7 and 15 parts by weight of dimethyl adipate, respectively. These mixtures are used to coat a sheet in a similar procedure as described in Example 1. Samples are tested for the coefficient of rate of color development as in Example 1. Results are shown in Table 2 below.

Table 2

| Amount of added dimethyl adipate (part by weight) | 0 | 3 | 5 | 7 | 15 |
|---|---|---|---|---|---|
| Coefficient of rate of color development | 1 | 5 | 10 | 15 | 5* |

*slight color development; inhibition is observed.

It is obvious from Table 2 that the addition of dimethyl adipate in a larger amount exceeding the range of this invention, suppresses the color development, while the addition in an adequate amount within the defined range is effective.

We claim:

1. A solvent for dye used in pressure-sensitive copying paper, comprising (a) an aromatic hydrocarbon selected from the group consisting of alkyl naphthalenes, alkyl biphenyls, triaryl dimethanes, diaryl ethanes and hydrogenated terphenyls and mixtures thereof and (b) an aliphatic acid di-ester of the formula

Wherein R is methyl or ethyl and n is an integer from 2 to 4, said di-ester being present in an amount of 0.5 to 10 parts by weight per 100 parts by weight of said aromatic hydrocarbon.

2. The solvent according to claim 1, wherein said di-ester of aliphatic acid is dimethyl succinate, diethyl succinate, dimethyl glutarate, diethyl glutarate, dimethyl adipate or dieethyl adipate.

3. The solvent according to claim 1, wherein said aromatic hydrocarbon is dipropyl naphthalene.

4. The solvent according to claim 1, wherein said biphenyl is isopropyl.

5. The solvent according to claim 1, wherein said aromatic hydrocarbon is dibenzyl toluene.

6. The solvent according to claim 1, wherein said aromatic hydrocarbon is phenyl xylyl ethane.

UNITED STATES PATENT AND TRADEMARK OFFICE
CERTIFICATE OF CORRECTION

PATENT NO. : 4,070,303
DATED : January 24, 1978
INVENTOR(S) : OHKUBO ET AL

It is certified that error appears in the above-identified patent and that said Letters Patent are hereby corrected as shown below:

IN THE ABSTRACT:

Line 4, change "ROOC (CH$_2$) COOR" to read --ROOC$-$(CH$_2$)$_n-$COOR

Column 1, line 62, before "has" delete "hydrocarbon--.

Column 4, line 34, change "dieethyl" to read --diethyl--;
line 38, delete in its entirety and
insert --aromatic hydrocarbon is isopropyl biphenyl--.

Signed and Sealed this

Twentieth Day of June 1978

[SEAL]

Attest:

RUTH C. MASON
Attesting Officer

DONALD W. BANNER
Commissioner of Patents and Trademarks